(12) United States Patent
Hegerty et al.

(10) Patent No.: US 7,584,183 B2
(45) Date of Patent: Sep. 1, 2009

(54) METHOD FOR NODE CLASSIFICATION AND SCORING BY COMBINING PARALLEL ITERATIVE SCORING CALCULATION

(75) Inventors: Ian Hegerty, Saint Benoit (FR); Farzin Maghoul, Hayward, CA (US)

(73) Assignee: Yahoo! Inc., Sunnyvale, CA (US)

( * ) Notice: Subject to any disclaimer, the term of this patent is extended or adjusted under 35 U.S.C. 154(b) by 267 days.

(21) Appl. No.: 11/346,860

(22) Filed: Feb. 1, 2006

(65) Prior Publication Data

US 2007/0179943 A1     Aug. 2, 2007

(51) Int. Cl.
 *G06F 17/30* (2006.01)
(52) U.S. Cl. .............................................. 707/5; 707/7
(58) Field of Classification Search ................ 707/500, 707/5, 3, 9, 101, 100
See application file for complete search history.

(56) References Cited

U.S. PATENT DOCUMENTS

| | | | | |
|---|---|---|---|---|
| 6,112,202 | A * | 8/2000 | Kleinberg | 707/5 |
| 6,285,999 | B1 * | 9/2001 | Page | 707/5 |
| 2003/0130993 | A1 * | 7/2003 | Mendelevitch et al. | 707/3 |
| 2005/0071741 | A1 * | 3/2005 | Acharya et al. | 715/500 |
| 2005/0086260 | A1 * | 4/2005 | Canright et al. | 707/104.1 |
| 2006/0004717 | A1 * | 1/2006 | Ramarathnam et al. | 707/3 |

OTHER PUBLICATIONS

Weighted PageRank Algorithm by Wnpu Xing and Ali Ghorbani, publication date: May 19-21, 2004. This paper appears in Communication Networks and Services Research, 2004, Proceedings, Second Annual Conference. On pp. 305-314.*
Brin et al., "*The Anatomy of a Large Scale Hypertextual Web Search Engine*," Computer Science Department, Stanford University, 1998, 20 pages.
Page et al., "*The PageRank Citation Ranking:, Bringing Order to the Web*," http://dbpubs.stanford.edu:8090/pub/showDoc.Fulltext?lang=en&doc=1999-66&format=pdf&compression=&name=1999-66.pdf, 1998, 17 pages.
"*Theme-based PageRank*," http://pr.efactory.de/e-pagerank-themes.shtml, Downloaded on Feb. 1, 2006, 8 pages.

* cited by examiner

*Primary Examiner*—Etienne P LeRoux
*Assistant Examiner*—Thuy (Tiffany) Bui
(74) *Attorney, Agent, or Firm*—Beyer Law Group LLP

(57) ABSTRACT

A plurality of documents is scored, where at least some of the documents are characterized by at least one link from at least one other of the documents. For each of at least particular ones of the plurality of documents, a score is assigned to that particular document, with respect to a topic, based at least in part on an incoherency characteristic associated with at least one document linking to that particular document.

24 Claims, 5 Drawing Sheets

METHOD FOR NODE CLASSIFICATION AND SCORING BY COMBINING PARALLEL ITERATIVE SCORING CALCULATION

BACKGROUND

The present invention relates to techniques for analyzing linked documents. More specifically, the invention relates to techniques for analyzing topics characterizing the linked documents, including considering the topic coherency of the documents as a part of the analysis.

The idea of a standard uniform pagerank methodology of linked documents is well understood. For example, see "The PageRank Citation Ranking, Bringing Order to the Web" 1998, by Larry Page, Sergey Brin, R. Motwani and T. Winograd ("Page 1998"). The standard uniform pagerank methodology refers to the computation of a single authority score per "page" (document). This single score for a particular page is an indication, based on links to the particular page from all the other pages in the set (e.g., accessible on the World Wide Web), of the overall relevance of the particular page.

In a uniform pagerank, a link to the particular page from a linking page is an indication of relevance of that page by the linking page. However, the indication of relevance of the particular page is reduced where the linking page links to pages other than the particular page, and the amount of reduction is dependent on the number of links to pages other than the particular page. This is known as "random jump" model, i.e., the probability that a random page "surfer" will get bored and jump to any page at random. Furthermore, the amount of relevance of a link from a linking page to the particular page is dependent on the relevance of the linking page as determined by all the other pages. This is known as an "authority score."

In a typical example, then, as described in the Page 1998 paper, standard uniform pagerank methodology is implemented using an iterative algorithm. FIG. 1 illustrates such an iterative algorithm in a very simplistic manner. Prior to the first iteration, a page 102 has an authority score of Score(0). After the first iteration, the same page has an authority score Score(1). After the second iteration, the same page has an authority score Score(2). After the third through Nth iteration, the same page has an authority score Score(N).

A variation on of standard uniform pagerank methodology is standard topic pagerank, which employs the computation of different pagerank scores for different topics. Each topic pagerank score is independent (i.e., restricts the set of pages to which the random surfer can jump to only those characterized by the topic), even though the computations for all the topics might run in parallel for efficiency of implementation. The authority score for a particular topic for a particular page is independent of the authority score for another topic for the same particular page (and, for that matter, for any other page).

Similar to FIG. 1, FIG. 2 simplistically illustrates an iterative algorithm for standard topic pagerank. Prior to the first iteration, each topic 102(a) through 102(d) of the page 102 has a topic-specific authority score of Score(a0) through Score(d0), respectively. After the first iteration, the same topics for the same page have a topic-specific authority score of Score(a1) through Score(d1), respectively. After the second iteration, the same topics for the same page have a topic-specific authority score of Score(a2) through Score(d2), respectively. After the third through Nth iteration, the same topics for the same page have a topic-specific authority score of Score(aN) through Score(dN), respectively.

SUMMARY

A plurality of documents is scored, where at least some of the documents are characterized by at least one link from at least one other of the documents. For each of at least particular ones of the plurality of documents, a score is assigned to that particular document, with respect to a topic, based at least in part on an incoherency characteristic associated with at least one document linking to that particular document.

DETAILED DESCRIPTION

One characteristic of standard topic pagerank methodology is "topic drift." That is, even a page that may be characterized by a particular topic is not necessarily "on topic," such that the topic-specific authority score contributed by such a page does not necessarily indicate the "authority" of that page on a particular topic (relevance of that page to the particular topic).

As an example, www.yahoo.com is a generically popular page and will be linked to from pages characterized by every topic. Thus, www.yahoo.com will have a high topic-specific authority score for every topic (i.e., is topic-incoherent). Significantly, as a result, the high topic-specific authority score is passed on to every page to which www.yahoo.com links, even though the www.yahoo.com page is topic-incoherent.

In accordance with an aspect of the invention, the effect of topic drift is reduced by reducing topic-specific authority score transfer through "incoherent hub" linking pages—linking pages that have topic-specific score authority for multiple topics, which causes topic drift. For example, by exploiting a series of parallel topic rank calculations; at each iteration "i" of the calculation, the scores for every topic are visible. As a simple example, if a linking page has topic-specific score authority for two topics, then the probability of following the outlinks from this linking page for each of the topics can be halved. (As a practical matter, simple thresholds for the topic-specific authority scores, or even more complex manipulations of the topic-specific authority scores, may be employed in determining how to reduce topic-specific score transfer through the linking pages as a result of topic incoherency.)

Figure 1:
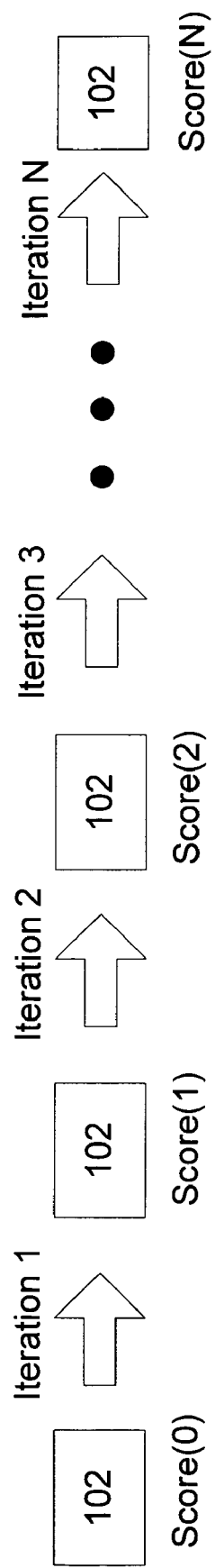
FIG. 1 is a block diagram illustrating a conventional method for computing standard uniform pagerank authority scores.
Figure 2:
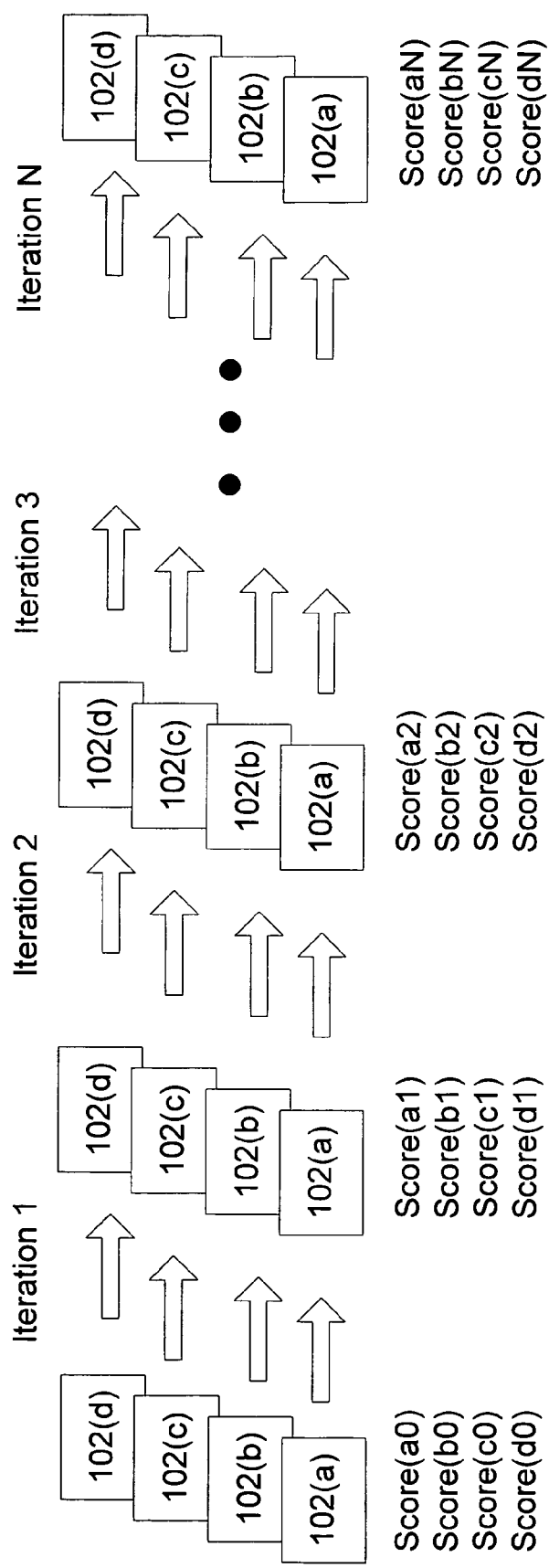
FIG. 2 is a block diagram illustrating a conventional method for computing standard topic pagerank authority scores.
Figure 3:
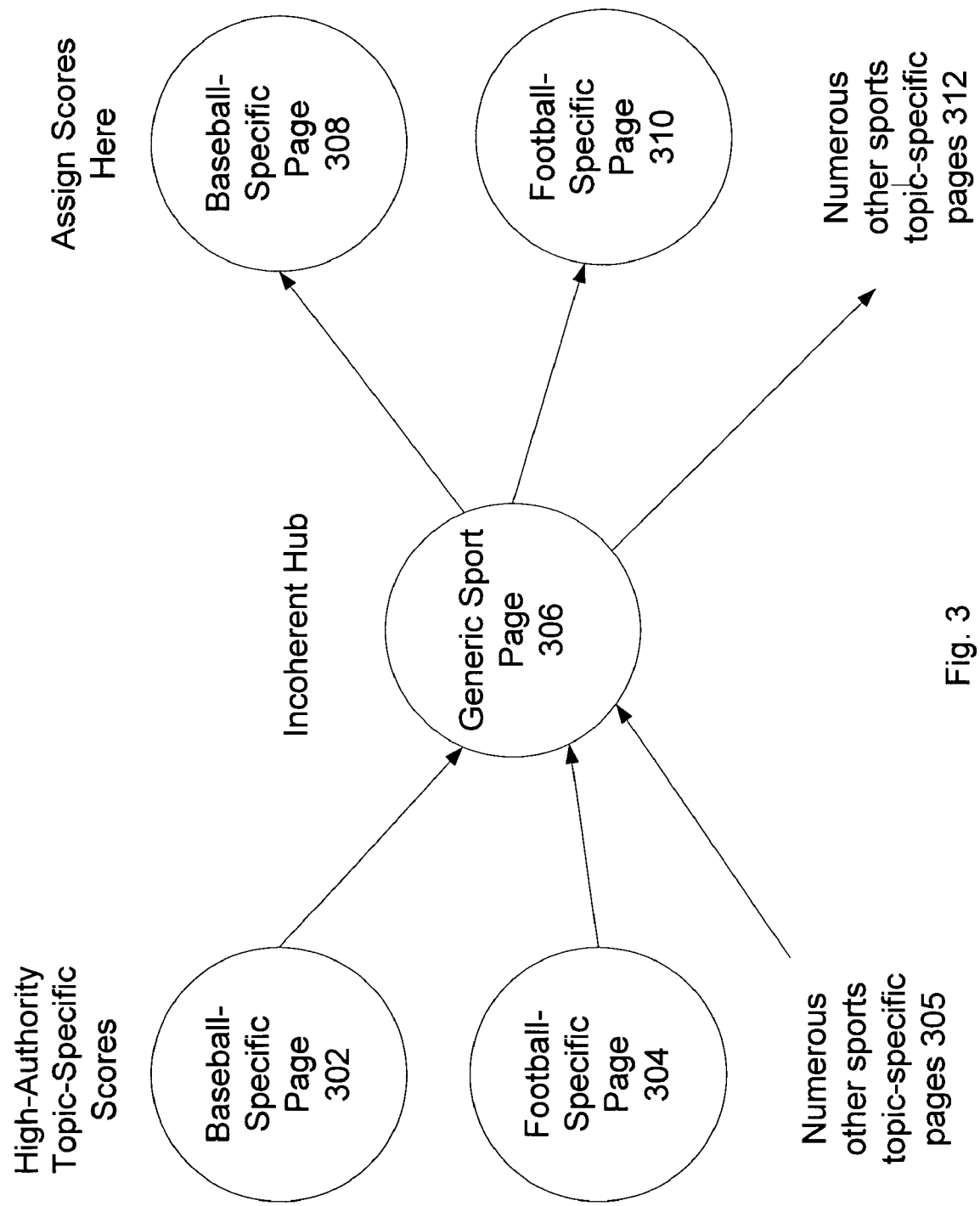
FIG. 3 illustrates a simple example of topic incoherency.

FIG. 3 illustrates a simple example of topic incoherency. A baseball-specific page 302 and a football-specific page 304 have relatively high topic-specific authority score for the topics of baseball and football, respectively. By contrast, the baseball-specific page 302 and the football-specific page 304 have relatively low topic-specific authority score for topics other than baseball and football, respectively. Furthermore, the baseball-specific page 302 and the football-specific page 304 have outlinks to the generic sports page 306. In addition, numerous other pages relating to specific sports topics (collectively denoted in FIG. 3 by reference numeral 305) also have outlinks to the generic sports page 306.

With respect to the outlinks of the generic sports page 306, this page has outlinks to a baseball-specific page 308, a football-specific page 310 and numerous other pages relating to specific sports topics (collectively denoted in FIG. 3 by reference numeral 312). Given the diverse topics of the pages linking to the generic sports page, the likelihood is reduced, for example, of a surfer from the baseball-specific page 302 to the generic sports page (linking page) surfing to the baseball-specific site 308. This is as compared to a situation where the generic sports page linking page has fewer specific-topic pages linking to it. Put generally, a linking page that has specific-topic pages for many different topics linking to it is considered to be of reduced authority with respect to those specific-topics because the topic-specific authority that would otherwise be passed on to the outlinks of that linking page is diluted.

Figure 4:
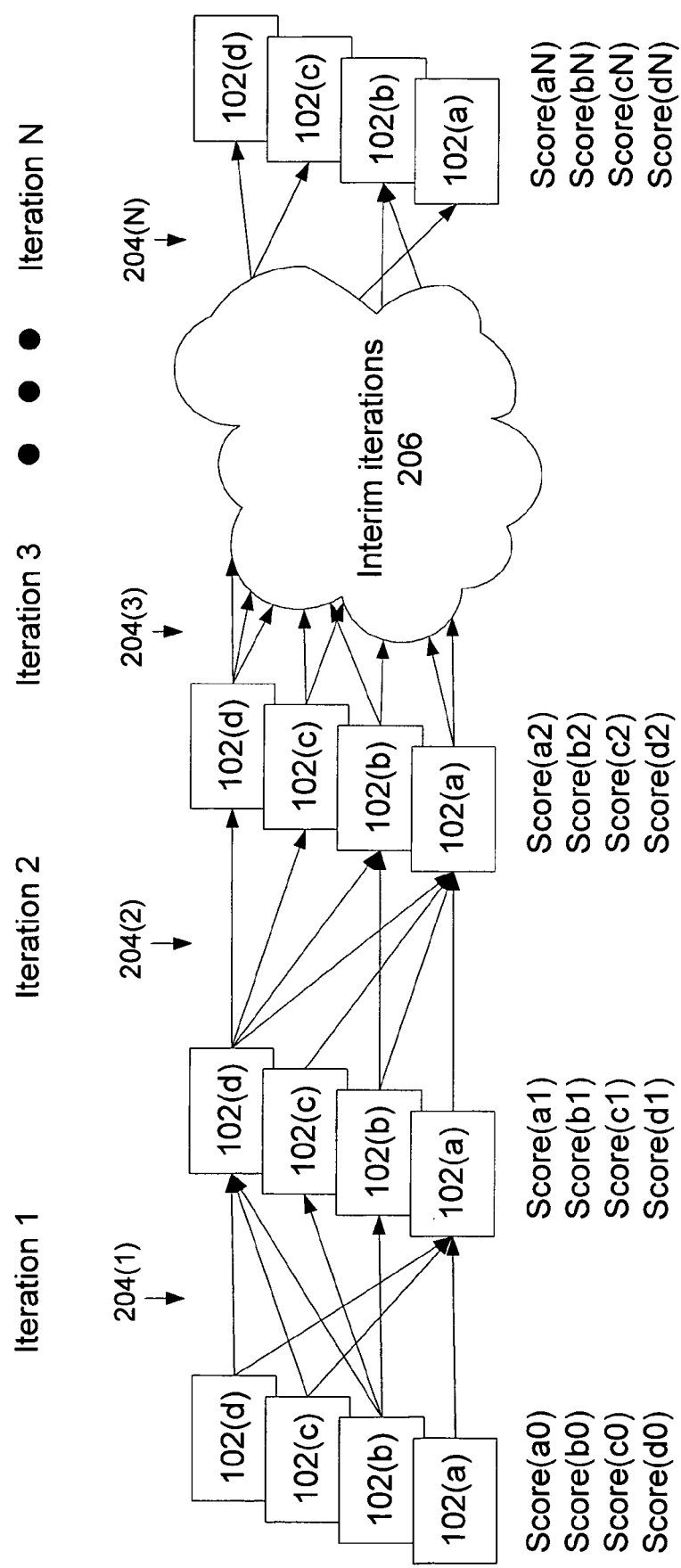
FIG. 4 simplistically illustrates an iterative algorithm for determining topic pagerank authority scores, which accounts for topic-incoherent pages, by considering the interaction of multiple topic pagerank authority scores (for different topics), in determining topic pagerank authority scores.

FIG. 4 simplistically illustrates an iterative algorithm for topic pagerank, where the result for one topic depends on the scores from that topic and other topics in the previous iteration. Prior to the first iteration, each topic 102(*a*) through 102(*d*) of the page 102 has a score of Score(a0) through Score(d0), respectively. After the first iteration, the same topics for the same page have a score of Score(a1) through Score(d1), respectively. After the second iteration, the same topics for the same page have a score of Score(a2) through Score(d2), respectively. After the third through Nth iteration, the same topics for the same page have a score of Score(aN) through Score(dN), respectively.

In one example, alluded to above, the topic score for a particular topic, at a particular iteration, is divided by the number of topic scores from a previous iteration that are above a threshold value. Thus, for example, whereas the pagerank partial sum calculation for a URL U was conventionally: $S_{i+1}(U)=$ $$\sum_{j \in I(U)} \frac{s_i(I_j(U))}{|O(I_j(U))|} \qquad \{\text{Eq. 1, conventional}\}$$

The pagerank partial sum calculation for the URL U is now:

$$S_{i+1}^1(U) = \sum_{j \in I(U)} \frac{S_i^1(I_j(U))}{|O(I_j(U))| * |T(I_j(U))|} \qquad \{\text{Eq. 2, new}\}$$

where O(U) is the outlinks of U and T(U) is the vector of topics of U. In some examples, only scores greater than a threshold (or meeting some other criteria) are employed, which accounts for the difference from iteration to iteration between which topic-specific authority scores from the previous iteration affect the topic-specific authority scores for the present iteration, as can be seen in FIG. 3 as the differences between the set of arrows 204(1), 204(2), 204(3) . . . 204(N)).

The difference in between Eq. 1 and Eq. 2 is the increased probability that the random surfer will jump back to a base set URL rather than jump to an outlink of the linking page. Thus, in the example illustration, the difference (shown below, in Eq. 3) is added back to the base set for the topic at the end of the iteration:

$$R_{sup(U)} = \sum_{j \in I(U)} S_i^1(I_j(U)) * \left( \frac{1}{|O(I_i(U))|} - \frac{1}{|O(I_i(U))| * |T(I_j(U))|} \right) \qquad \{\text{Eq. 3, difference}\}$$

Various forms of the relationship between the partial sum and topic score vector may be employed. The random jump probability, incorporated into the topic-specific pagerank scores, is based on the interaction of multiple parallel topic pageranks.

It is noted that the topic-specific pagerank methodology, accounting for linking document incoherence, may be implemented with respect to any or all types of documents for which such ranking is a useful functionality, and on any computing platform and in any network topology in which such ranking is a useful functionality. The methodology may also be practiced in a wide variety of network environments, e.g., TCP/IP-based networks, telecommunications networks, wireless networks, etc.

Figure 5:
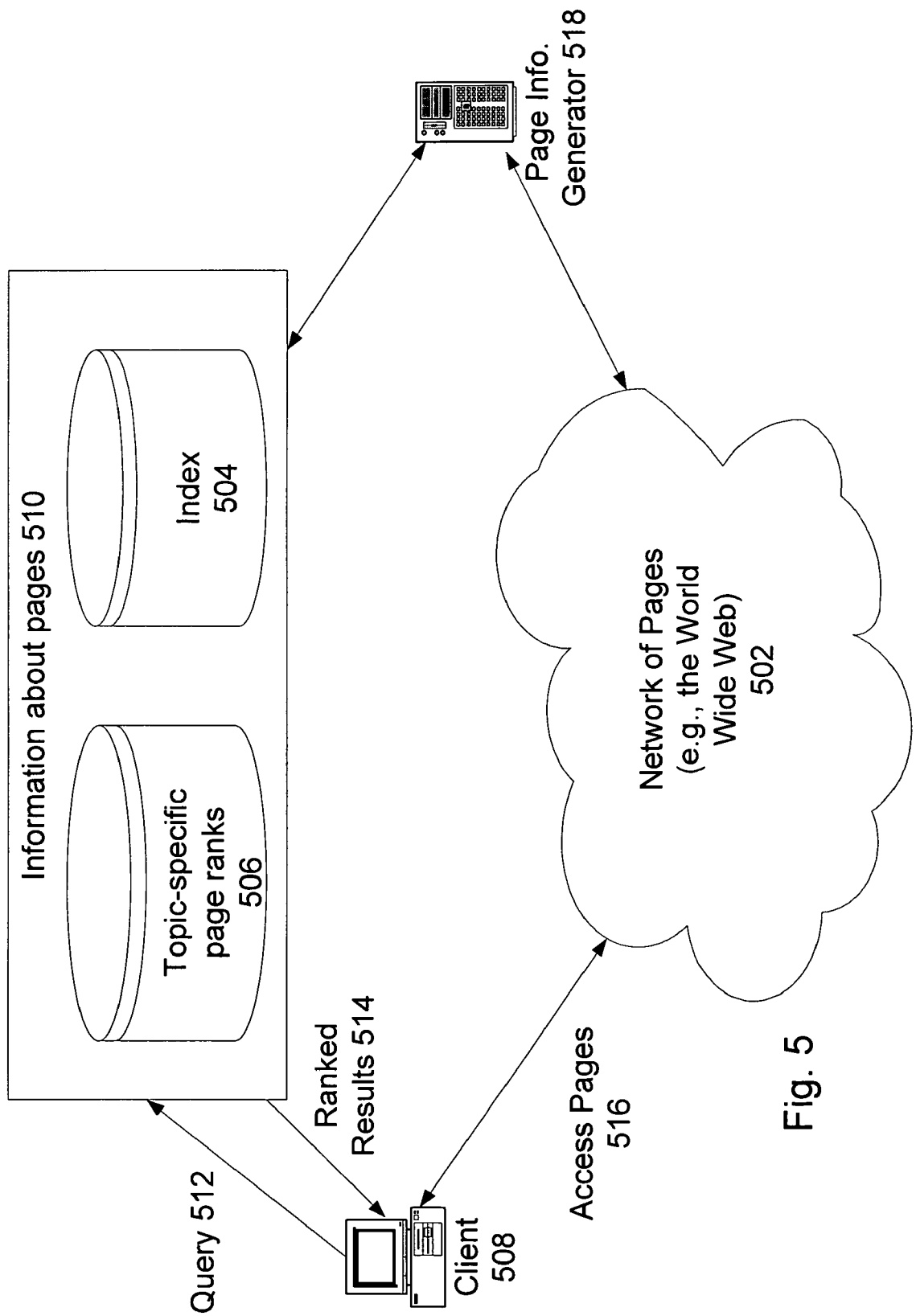
FIG. 5 illustrates an exemplary system diagram, illustrating a context in which the determined topic pagerank authority scores may be utilized.

FIG. 5 illustrates, in a simplified manner, how a collection of topic-specific page rankings, generated in accordance with the methodology discussed herein, may be utilized. Referring to FIG. 5, a network of pages 502 (such as the World Wide Web) includes pages having links to other pages. For example, the links may be Uniform Resource Locators (URL's) usable by browser programs such as may execute on a client computer 508. A page information generator 518 generates a collection 510 of information about the pages 502.

The collection 510 of information includes topic-specific page ranks 506 (e.g., generated by the page information generator 518 in accordance with the methodology discussed herein), as well as an index to the pages usable to match a query 512 from the client computer 508 to pages 502. In response to such a query 512, ranked results 514 are provided to the client computer 508. Typically, the ranked results 514 include an ordered list of links to the pages 502. Using the ranked results 514, the client computer 508 may access the pages (denoted by reference numeral 516).

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to particular equations to account for topic incoherence of a linking document. However, it will be understood that other methods may be utilized to account for topic incoherence of a linking document.

We now discuss some particular applications of a topic page rank determined with consideration of topic coherency. One such application is targeting advertisements based on the topic page rank computed in this manner. For example, delivering targeted advertisements based on the page content is typically done by textual analysis of the page content. In accordance with one example, a determined "topic pagerank" is utilized. For example, by considering the topic pagerank, it can be determined that the topic of a page is jaguar animals, and advertisements for Jaguar automobiles may be suppressed. Given that the consideration of topic coherency improves the "accuracy" of a determined topic pagerank, the use of such a determined page rank improves the targeting of advertisements. For background, see http://www.jensense.com/archives/2005/06/comparing_the_r.html.

Other applications include international considerations, such as country tagging, or country-specific pageranks (considering each country's web to have a separate "topic pagerank") It is conventional for search engines to use a link popularity score to assist in ordering algorithmic results. For worldwide results, this is either based on a uniform global perspective, where a vote from every page is considered equal; or from a "quality-biased" perspective where pages from human reviewed directories (ODP, Yahoo!) are given additional weight. Both of these have unwanted effects; for example the results displayed to US users for a query (e.g., movies) could be affected by the linking behavior of websites in India and so give results about Bollywood higher rankings than would be expected or desirable.

Many search engines such as Google and Yahoo! display to international users the option to restrict their results to "country" results; and additionally they might try to boost the results displayed to country users in some manner. Improved results may be achieved by using a link popularity score based on the target users' geographical area. As an example, UK users could be shown results where sites linked to by UK websites are given higher rankings. This would be a "country pagerank" and is intrinsically no different from a "topic pagerank"; except the set of URLs to which a random jump may occur is all the URLs determined to be in the UK.

In this scenario, a method would operated according to the description above, where pages that are determined to be of interest to many countries are deemed to be less specific (i.e., less coherent) to any one country's users. This would result in, for example, a higher score for www.yahoo.co.uk for UK users than for www.yahoo.com or www.yahoo.in. For background, see United States Patent Publication No. 20050097202. Also, see www.yahoo.co.uk for "UK only" search.

Another application includes disambiguation of assisted search suggestions, such as related search. For example, in response to some queries, suggested further related queries are displayed. For example, for "jaguar," the following may be displayed:

Also try: jaguar cars, jaguar fender, jaguar OS

By tracking across all users the pages that are clicked after one of these suggested queries has been searched, and classify them to one of our topics, the presentation of suggested queries may be enhanced. For example, the presentation may give preference to or display only those related terms that agree with users' previously determined preferences. As another example, the presentation may cause display of the most popular for each major category, so that the user is given the best opportunity to disambiguate his query (e.g., [jaguar cars, jaguar <the cat>, jaguar OSX] rather than [jaguar cars, jaguar XJS, jaguar xk8, jaguar xj6]. The use of the topic page rank with consideration of coherency improves the accuracy of page classification against a set of topics.

Another application is anti-spam (excluding generically popular pages may reveal incoherent pages). In particular, a "feature" is determined for each page, for every page, which can be called an "incoherency factor." There are two reasons for a page being incoherent: The page is generally popular across many topics: e.g. www.cnn.com, www.yahoo.com etc. Another reason is that the page is spammy; such that artificial links are placed from many unrelated sites. A good example of when this might happen is automatic guestbook signing scripts, which leave a link in order to increase the number of links. Some function of the incoherency factor against another link popularity measure (for example, unique inlinking hosts) gives an indication of which pages are "spammy" pages.

Another application includes extending the determination of topic page rank with consideration of coherency to know consider the relationship between different topics (for example, Parent-Child relationships such as Sports/ and Sports/Baseball, or peer: Sports/Soccer and Sports/Hockey) and reacting appropriately. This extension may increase the accuracy and reach of the thus-determined topic page rank. As described above, a link from a page concerned with many topics is downgraded in a manner independent of the relationship between the two topics. However many links are either generalizations (from Sports/Baseball to Sports/) or specializations (the inverse) and should be treated more leniently.

Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the claims.

What is claimed is:

1. A method of scoring a plurality of documents, where at least some of the documents are characterized by at least one link from at least one other of the documents, the method comprising:

for each of at least particular ones of the plurality of documents, assigning a score to that particular document, with respect to a particular topic, based at least in part on a characterization of topic incoherency associated with at least one document linking, from the at least one document with which the characterization of topic incoherency is associated, to that particular document, wherein the characterization of topic incoherency of the at least one document linking, from the at least one document with which the characterization of topic incoherency is associated, to that particular document is an indication of an amount of topic-specific score authority for each of multiple topics of the at least one document linking to that particular document, wherein the higher the topic-specific authority for each of multiple topics of the at least one document linking to that particular document, the indicated topic incoherency associated with the at least one document linking to that particular document is higher;

wherein the score assigned to that particular document is reduced based on higher topic incoherency of the at least one document linking to that particular document; and wherein the method further comprises determining a value indicative of a probability of not linking to any of the at least particular ones of the plurality of documents; and accounting for the determined value with respect to scores of documents other than the at least particular ones of the plurality of documents.

2. The scoring method of claim 1, wherein:

the step of assigning a score to that particular document, with respect to the topic, based at least in part on a characterization of topic incoherency associated with at least one document linking to that particular document includes treating the characterization of topic incoherency as a weighting factor with respect to assigning a score to that particular document, with respect to the topic.

3. The scoring method of claim 1, wherein:
the step of assigning a score to a particular document, with respect to the topic, based at least in part on a characterization of topic incoherency associated with at least one document linking to that particular document includes:
assigning a score to that particular document, with respect to the topic, based on the score, with respect to the topic, of each of the at least one document linking to that particular document, weighted by the characterization of topic incoherency associated with the at least one document linking to that particular document.

4. The scoring method of claim 1, further comprising:
determining the characterization of topic incoherency associated with each of the at least one document linking to that particular document includes, for each of the at least one document linking to that particular document, processing an indication of topics associated with that linking document.

5. The scoring method of claim 4, wherein:
processing an indication of topics associated with that linking document includes determining the characterization of topic incoherency as a function of scores, with respect to a plurality of topics, for that linking document.

6. The scoring method of claim 5, wherein:
the step of assigning a score to a particular document, with respect to the topic, based at least in part on a characterization of topic incoherency associated with at least one document linking to that particular document includes:
weighting the score assigned to that particular document, for the topic, by the characterization of topic incoherency associated with the at least one document linking to that particular document, so as to result in less weighting of the score assigned to that particular document, for the topic, the greater the number of topics associated with that linking document.

7. The scoring method of claim 6, wherein:
the number of topics associated with that linking document is determined based on a score, with respect to that linking document, for each of the topics associated with that linking document.

8. The scoring method of claim 1, wherein:
the score assigning step is performed iteratively among the plurality of documents.

9. The method of claim 1, further comprising:
repeating the score assigning step for each of the at least particular one of the plurality of documents, for each of a plurality of topics.

10. The method of claim 9, further comprising:
targeting an advertisement to a viewer of a particular page based on the topic scores.

11. The method of claim 9, wherein:
the plurality of topics are counties associated with the documents; and the method further comprises adjusting a search result based on the topic scores.

12. The method of claim 9, further comprising:
in response to a search query from a user, presenting a plurality of assisted search suggestions, wherein presenting the plurality of assisted search suggestions includes considering preferences of the user relative to determined topic scores for documents chosen by other users in response to particular assisted search suggestions.

13. The method of claim 9, further comprising:
determining for each document a factor that is nominally indicative of whether that document is spammy, including considering topic scores for each document, across a plurality of topics, relative to a link popularity measure for that document.

14. The method of claim 1, wherein:
the characterization of topic incoherency for the document linking to that particular document is adjusted based on a relationship between topics of the linking document to topics of that particular document.

15. The method of claim 14, wherein:
adjusting the characterization of topic incoherency includes indicating a linking document as less coherent, relative to that particular document, based on a generalization or specialization relationship between the topics of the linking document to topics of that particular document.

16. A computing device operable to perform a method of scoring a plurality of documents, where at least some of the documents are characterized by at least one link from at least one other of the documents, the method comprising:
for each of at least particular ones of the plurality of documents, assigning a score to that particular document, with respect to a particular topic, based at least in part on a characterization of topic incoherency associated with at least one document linking, from the at least one document with which the characterization of tonic incoherency is associated, to that particular document,
wherein the characterization of tonic incoherency of the at least one document linking, from the at least one document with which the characterization of topic incoherency is associated, to that particular document is an indication of an amount of topic-specific score authority for each of multiple topics of the at least one document linking to that particular document,
wherein the higher the topic-specific authority for each of multiple topics of the at least one document linking to that particular document, the indicated tonic incoherency associated with the at least one document linking to that particular document is higher;
wherein the score assigned to that particular document is reduced based on higher topic incoherency of the at least one document linking to that particular document; and
wherein the method further comprises
determining a value indicative of a probability of not linking to any of the at least particular ones of the plurality of documents; and
accounting for the determined value with respect to scores of documents other than the at least particular ones of the plurality of documents.

17. A method of operating a computing device to search a network of pages, comprising:
querying to a collection of information about the pages of the network of pages, wherein the collection of information about the pages includes:
an index of the pages; and
a collection of scores for the pages generated according to the steps of:
for each of at least particular ones of the plurality of documents, assigning a score to that particular document, with respect to a particular topic, based at least in part on a characterization of topic incoherency associated with at least one document linking, from the at least one document with which the characterization of topic incoherency is associated, to that particular document,
wherein the characterization of topic incoherency of the at least one document linking, from the at least one document with which the characterization of topic incoherency is associated, to that particular document is an indication of an amount of topic-specific score authority for each of multiple topics of the at least one document linking to that particular document, wherein the higher the topic-specific authority for each of multiple topics of the at least one document linking to that particular document, the indicated topic incoherency associated with the at least one document linking to that particular document is higher;

wherein the score assigned to that particular document is reduced based on higher topic incoherency of the at least one document linking to that particular document; and wherein the steps by which the collection of scores for the pages generated further include determining a value indicative of a probability of not linking to any of the at least particular ones of the plurality of documents; and accounting for the determined value with respect to scores of documents other than the at least particular ones of the plurality of documents; and the method of operating the computing device to search a network of pages further comprising receiving, in response to the query, an indication of pages according to the index of pages, ranked according to the collection of scores.

18. The method of claim 17, further comprising:

accessing at least one of the pages indicated by the received indication of pages.

19. A computer program product for scoring a plurality of documents, where at least some of the documents are characterized by at least one link from at least one other of the documents, the computer program product comprising at least one tangible computer-readable medium having computer program instructions stored therein which are operable to cause at least one computing device to:

for each of at least particular ones of the plurality of documents, assign a score to that particular document, with respect to a particular topic, based at least in part on a characterization of topic incoherency associated with at least one document linking, from the at least one document with which the characterization of topic incoherency is associated, to that particular document, wherein the characterization of topic incoherency of the at least one document linking, from the at least one document with which the characterization of topic incoherency is associated, to that particular document is an indication of an amount of topic-specific score authority for each of multiple topics of the at least one document linking to that particular document, wherein the higher the topic-specific authority for each of multiple topics of the at least one document linking to that particular document, the indicated topic incoherency associated with the at least one document linking to that particular document is higher;

wherein the score assigned to that particular document is reduced based on higher topic incoherency of the at least one document linking to that particular document; and wherein the computer program instructions are further operable to cause the at least one computing device to determine a value indicative of a probability of not linking to any of the at least particular ones of the plurality of documents: and account for the determined value with respect to scores of documents other than the at least particular ones of the plurality of documents.

20. The computer program product of claim 19, wherein:

the computer program instructions operable to cause the at least one computing device to assign a score to that particular document, with respect to the topic, based at least in part on a characterization of topic incoherency associated with at least one document linking to that particular document includes computer program instructions operable to cause the at least one computing device to treat the characterization of topic incoherency as a weighting factor with respect to assigning a score to that particular document, with respect to the topic.

21. The computer program product of claim 19, wherein:

the computer program instructions operable to cause the at least one computing device to assign a score to a particular document, with respect to the topic, based at least in part on a characterization of topic incoherency associated with at least one document linking to that particular document includes:

computer program instructions operable to cause the at least one computing device to assign a score to that particular document, with respect to the topic, based on the score, with respect to the topic, of each of the at least one document linking to that particular document, weighted by the characterization of topic incoherency associated with the at least one document linking to that particular document.

22. The computer program product of claim 19, wherein:

the computer program instructions further include computer program instructions operable to cause the at least one computing device to determine the characterization of topic incoherency associated with each of the at least one document linking to that particular document includes, for each of the at least one document linking to that particular document, processing an indication of topics associated with that linking document.

23. The computer program product of claim 22, wherein:

the computer program instructions operable to cause the at least one computing device to process an indication of topics associated with that linking document includes computer program instructions operable to cause the at least one computing device to determine the characterization of topic incoherency as a function of scores, with respect to a plurality of topics, for that linking document.

24. The computer program product of claim 23, wherein:

the computer program instructions operable to cause the at least one computing device to assign a score to a particular document, with respect to the topic, based at least in part on a characterization of topic incoherency associated with at least one document linking to that particular document includes:

computer program instructions operable to cause the at least one computing device to weight the score assigned to that particular document, for the topic, by the characterization of topic incoherency associated with the at least one document linking to that particular document, so as to result in less weighting of the score assigned to that particular document, for the topic, the greater the number of topics associated with that linking document.

* * * * *